United States Patent [19]

Kanda et al.

[11] 4,359,981
[45] Nov. 23, 1982

[54] HIGH COMPRESSION TYPE INTERNAL COMBUSTION ENGINE

[75] Inventors: Mutsumi Kanda; Kiyoshi Nakanishi, both of Susono; Katsuhiko Motosugi, Toyota, all of Japan

[73] Assignee: Toyota Jidosha Kogyo Kabushiki Kaisha, Aichi, Japan

[21] Appl. No.: 183,380

[22] Filed: Sep. 2, 1980

[30] Foreign Application Priority Data

Sep. 20, 1979 [JP] Japan .......................... 54-129414[U]

[51] Int. Cl.³ ............................................. F02B 3/00
[52] U.S. Cl. .................................. 123/263; 123/287; 123/188 M; 123/198 H
[58] Field of Search ....................... 123/263, 285–287, 123/657, 661, 193 H

[56] References Cited

U.S. PATENT DOCUMENTS

| | | | |
|---|---|---|---|
| 2,126,939 | 8/1938 | Winfield | 123/657 |
| 3,927,655 | 12/1975 | Goto et al. | 123/193 H |
| 3,945,363 | 3/1976 | Elsbett et al. | 123/188 M |
| 4,000,722 | 1/1977 | May | 123/263 |
| 4,121,544 | 10/1978 | May | 123/287 |
| 4,166,436 | 9/1979 | Yamakawa | 123/193 P |
| 4,267,806 | 5/1981 | Kankia et al. | 123/287 |

Primary Examiner—Craig R. Feinberg
Attorney, Agent, or Firm—Stevens, Davis, Miller & Mosher

[57] ABSTRACT

A high compression type internal combustion engine comprising a cylinder head having a flat inner wall, and a piston having a flat top face. The flat inner wall and the flat top face form a squish area therebetween. A recess having a lung-shaped cross-section is formed in the cylinder head. A shallow groove is formed on the flat inner wall of the cylinder head so as to extend from the intake valve to the recess. An exhaust valve is arranged on the bottom of the recess. The squish area comprises a first squish area portion and a second squish area portion. The first squish area portion has an area which is about four times the area of the second squish area portion. A spark plug is arranged in the recess at a position near the first squish area portion and remote from the second squish area portion.

7 Claims, 3 Drawing Figures

HIGH COMPRESSION TYPE INTERNAL COMBUSTION ENGINE

BACKGROUND OF THE INVENTION

The present invention relates to an internal combustion engine, and particularly relates to the construction of the combustion chamber of a high compression type internal combustion engine.

As a method of improving specific fuel consumption, there is a method of increasing the compression ratio of an engine. However, in a conventional engine, when the compression ratio is increased and, in addition, normal gasoline is used, knocking occurs and, as a result, the exhaust emission and specific fuel consumption deteriorate. Consequently, in order to prevent knocking from occurring in such a conventional engine, it is necessary to use a gasoline having an octane number which is higher than that of normal gasoline. In order to increase the output power of an engine in such a way that the pressure in the combustion chamber peaks immediately after top dead center while suppressing the occurrence of knocking, it is necessary to increase the burning velocity. In a high compression type engine, if the pressure in the combustion chamber peaks immediately after top dead center by increasing the burning velocity while suppressing the occurrence of knocking, it is possible to approach the advancing limit of ignition timing, at which knocking occurs, to MBT (Minimum Spark Advance for Best Torque) even if normal gasoline having a low octane number is used. As a result, a satisfactorily high output can be obtained and, at the same time, the exhaust emission and specific fuel consumption can be improved over those of the prior art even if gasoline having a low octane is used. However, in a conventional engine, when the compression ratio is increased and, in addition, normal gasoline is used, since knocking occurs as mentioned above, the exhaust emission and a specific fuel consumption deteriorate.

SUMMARY OF THE INVENTION

An object of the present invention is to provide a high compression type internal combustion engine capable of having an improved exhaust emission and specific fuel consumption compared to the prior art even if normal gasoline is used.

According to the present invention, there is provided an internal combustion engine comprising: a cylinder block having a cylinder bore therein; a piston reciprocally movable in said cylinder bore and having a substantially horizontally extending flat top face; a cylinder head having an inner wall comprising a substantially horizontally extending flat portion and a recessed portion which is arranged at a periphery of said inner wall and has a circumferential wall and a bottom wall, said flat portion being arranged at a position close to the flat top face of said piston positioned at top dead center for forming a squish area therebetween, said piston and said cylinder head forming a combustion chamber therebetween; a helically shaped intake passage formed in said cylinder head and having an intake valve therein, said intake valve having a valve head which has a front face exposed to said combustion chamber, the front face of said valve head being arranged at a level which is approximately equal to a level of said flat portion; an exhaust valve arranged on the bottom wall of said recessed portion and having a valve head; said squish area comprising a first squish area portion and a second squish area portion which are divided by a straight line passing through an axis of said intake valve and an axis of said exhaust valve, said first squish area portion having an area which is about four times the area of said second squish area portion; a groove formed on said flat portion and extending from the valve head of said intake valve to said recessed portion, said groove having an approximately uniform depth which is slightly larger than the clearance between said flat portion and the flat top face of said piston positioned at top dead center and, a spark plug having a spark gap arranged in said groove at a position near said second squish area portion and remote from said first squish area portion.

The present invention may be more fully understood from the description of a preferred embodiment of the invention set forth below, together with the accompanying drawings.

DESCRIPTION OF A PREFERRED EMBODIMENT

Figure 1:
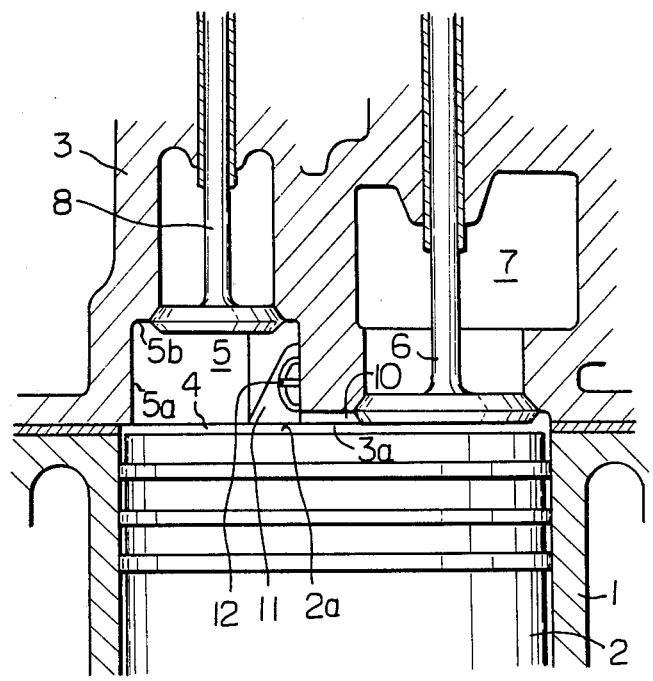
FIG. 1 is a cross-sectional side view of an engine according to the present invention, taken along the line I—I in FIG. 2.
Figure 2:
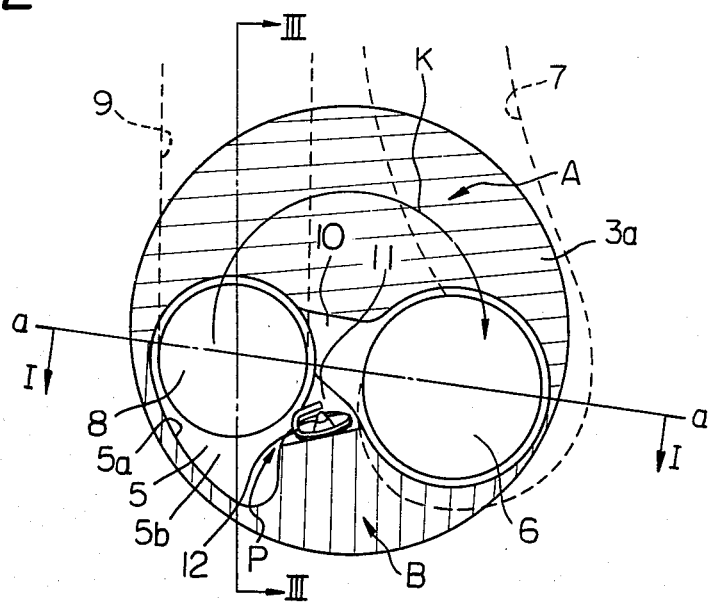
FIG. 2 is a bottom view of the cylinder head illustrated in FIG. 1.
Figure 3:
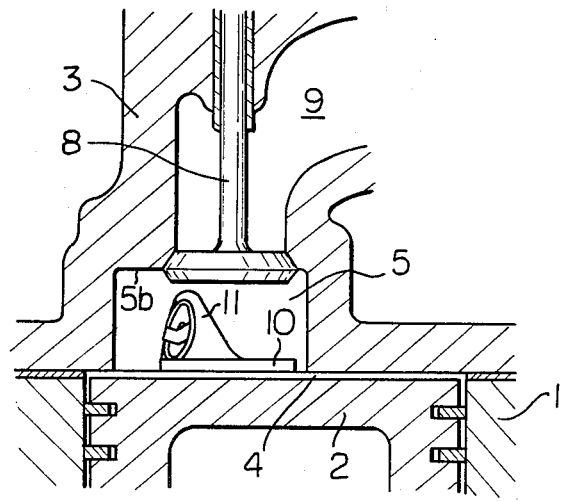
FIG. 3 is a cross-sectional side view taken along the line III—III in FIG. 2.

Referring to FIGS. 1 through 3, 1 designates a cylinder block, 2 a piston having a flat top face 2a and reciprocally moving in the cylinder block 1, 3 a cylinder head having a flat inner wall 3a and fixed onto the cylinder block 1, and 4 a combustion chamber formed between the piston 2 and the cylinder head 3; 5 designates a vertically extending recess formed in the cylinder head 3 at the periphery of the flat inner wall 3a of the cylinder head 3; 6 an intake valve, 7 a helically shaped intake port, 8 an exhaust valve and 9 an exhaust part. The recess 5 has a vertically extending circumferential wall 5a and a horizontally extending flat bottom 5b. In addition, as is illustrated in FIG. 2, the recess 5 has a lung-shaped cross-section extending in the circumferential direction of the combustion chamber 4 (FIG. 1) and having a concave contour portion P, and the exhaust valve 8 is arranged on the flat bottom 5b. The intake valve 6 is arranged on the flat inner wall 3a of the cylinder head 3, so that the front face of the valve head of the intake valve 6, which is exposed to the combustion chamber 4, is positioned at a level which is approximately the same as that of the flat inner wall 3a. The piston 2 and the cylinder head 3 are so constructed so that the clearance between the flat top face 2a of the piston 2 and the flat inner wall 3a of the cylinder head 3 is less than 1.25 mm when the piston 2 is positioned at top dead center, as illustrated in FIG. 1. Consequently, a horizontally extending flat squish area is formed between the flat top face 2a of the piston 2 and the flat inner wall 3a of the cylinder head 3 when the piston 2 is positioned at top dead center. As illustrated in FIG. 2, the squish area comprises a squish area portion A, illustrated by horizontal hatching and located above a straight line a—a passing through the axis of the intake valve 6 and the axis of the exhaust valve 8, and a squish area portion B, illustrated by vertical hatching and located below the straight line a—a. As will be understood from FIG. 2, the squish area portions A and B are formed so as to enclose the recess 5 and, in addition, the squish area portions A and B are so formed that they have an area of more than 40 percent relative to the cross-sectional area of the cylinder bore of the engine. The squish area portion A has an area which is larger than that of the squish area portion B. In the embodiment illustrated in FIG. 2, a ratio of an area of the squish area portion A to an area of the squish area portion B is about 4:1. A shallow groove 10, having a uniform depth and extending from the valve head of the intake valve 6 towards the recess 5, is formed on the flat inner wall 3a of the cylinder head 3. As illustrated in FIG. 2, the groove 10 has a width which is slightly smaller than the diameter of the valve head of the exhaust valve 8. In addition, a depression 11, connected to the inside of the recess 5, is formed in the groove 10 near the squish area portion B relative to the straight line a, and an electrode of a spark plug 12 is arranged in the depression 11. As illustrated in FIGS. 2 and 3, the inner wall of the depression 11, on which the electrode of the spark plug 12 is arranged, is arranged to be slightly inclined towards the recess 5 with respect to a vertical plane passing through the axis of the intake valve 6 and the axis of the exhaust valve 8. This arrangement of the inner wall of the depression 11 is very important. According to the experiments conducted by the inventors, it has been proven that the effectiveness of suppressing of the occurrence of knocking becomes weak in the case wherein the inner wall of the depression 11, on which the electrode of the spark plug 12 is arranged, is directed towards the intake valve 6.

In operation, during the intake stroke a combustible mixture is introduced into the combustion chamber 4 via the intake valve 6. At this time, since the intake port 7 has a helical shape, the mixture introduced into the combustion chamber 4 swirls in the direction illustrated by arrow K in FIG. 2. Then, the mixture in the combustion chamber 4 is gradually compressed as the piston 2 moves upwards. Since the swirl motion indicated by the arrow K is maintained during a time when the piston 2 moves upwards, turbulence is caused in the recess 5 due to the swirl motion indicated by the arrow K. When the piston 2 reaches about 30 degrees before top dead center, squish flows are directly spouted, or spouted via the groove 10, into the recess 5 from the squish area portions A and B formed between the flat top face 2a of the piston 2 and the flat inner wall 3a of the cylinder head 3. The squish flows flowing into the recess 5 from the periphery of the recess 5 come into violent contact with each other and, as a result, a strong turbulence is created in the recess 5. After this, when the combustible mixture is ignited by the spark plug 12, a flame core is created around the electrode of the spark plug 12, and the flame core thus created rapidly grows towards the recess 5 due to the squish flows flowing in the groove 10. Since a strong turbulence is created in the recess 5, the burning velocity is considerably increased. When the piston 2 reaches top dead center, the distance between the flat top face 2a of the piston 2 and the flat inner wall 3a of the cylinder head 3 is reduced below the quench distance and, as a result, the flame cannot propagate into the squish area portions A, B formed between the flat top face 2a of the piston 2 and the flat inner wall 3a of the cylinder head 3. After this, when the piston 2 moves downwards and reaches 15 through 25 degrees after top dead center, the flame and the unburned mixture which are located in the recess 5 and the groove 10 are sucked into the squish area portions A and B due to the temporary pressure drop occurring in the squish area portions A and B and, as a result, the flame propagates into the squish area portions A and B at an extremely high speed. As mentioned above, since the squish area portion A has an area which is considerably larger than that of the squish area portion B and, consequently, the temporary pressure drop in the squish area portion A is greater than that in the squish area portion B, a large part of the unburned mixture and the flame within the recess 5 is sucked into the squish area portion A in the direction of the arrow K. In addition, since the flame of the mixture, ignited by the spark plug 12, moves within the recess 5 in the direction of the arrow K, the flame rapidly spreads into the squish area portion A. As mentioned above, by arranging the squish area portion A, having a large area, in the moving direction of the flame, the buring velocity can be considerably increased.

In addition, the temperature of the mixture located furthest from the spark plug 12 in the periphery of the squish area portion A, becomes high due to the compressing operation and, as a result, there is a danger that self-ignition of the mixture is caused and, accordingly, knocking occurs. However, in the present invention, since the swirl motion of arrow K is caused in the combustion chamber 4 by using the helically shaped intake port 7, an unburned mixture located in the periphery of the squish area portion A is moved and cooled by the mixture swirling in the direction of the arrow K. As a result of this, it is possible to prevent self-ignition of an unburned mixture and, therefore, it is possible to prevent knocking from occurring.

According to the present invention, since the burning velocity is considerably increased while suppressing the occurrence of knocking, it is possible to approach the advancing limit of the ignition timing, at which knocking occurs, to MBT. As a result of this, the Research Octane Number can be reduced as compared with that in a prior engine. In addition, even if a fuel having a low octane number is used, a satisfactorily high output of the engine can be obtained, and the specific fuel consumption and the exhaust emission can be improved over a prior engine.

While the invention has been described by reference to a specific embodiment chosen for purposes of illustration, it should be apparent that numerous modifications could be made thereto by those skilled in the art without departing from the spirit and scope of the invention.

We claim:

1. An internal combustion engine comprising:
    a cylinder block having a cylinder bore therein;
    a piston reciprocally movable in said cylinder bore and having a substantially horizontally extending flat top face;
    a cylinder head having an inner wall comprising a substantially horizontally extending flat portion and a recessed portion which is arranged at a periphery of said inner wall and has a circumferential wall and a bottom wall, said flat portion being arranged at a position close to the flat top face of said piston positioned at top dead center for forming a squish area therebetween, said piston and said cylinder head forming a combustion chamber therebetween;
    a helically shaped intake passage formed in said cylinder head and having an intake valve therein, said intake valve having a valve head which has a front face exposed to said combustion chamber, the front face of said valve head being arranged at a level which is approximately equal to a level of said flat portion;

an exhaust valve arranged on the bottom wall of said recessed portion and having a valve head;

said squish area comprising a first squish area portion and a second squish area portion which are divided by a straight line passing through an axis of said intake valve and an axis of said exhaust valve, said first squish area portion having an area which is about four times the area of said second squish area portion;

a groove formed on said flat portion and extending from the valve head of said intake valve to said recessed portion, said groove having an approximately uniform depth which is slightly larger than the clearance between said flat portion and the flat top face of said piston positioned at top dead center, and;

a spark plug having a spark gap arranged in said groove in the vicinity of said exhaust valve at a position near said second squish area portion and remote from said first squish area portion;

a depression connected to said recessed portion formed on said groove, said depression having an inner wall which is connected to the circumferential wall of said recessed portion and on which the spark gap of said spark plug is arranged, the inner wall of said depression being arranged to be slightly inclined towards said recessed portion with respect to a vertical plane passing through the axis of said intake valve and the axis of said exhaust valve.

2. An internal combustion engine as claimed in claim 1, wherein said clearance between said the flat portion of said cylinder head and the flat top face of said piston positioned at top dead center is less than 1.25 mm.

3. An internal combustion engine as claimed in claim 1, wherein said squish area has an area of more than 40 percent relative to the cross-sectional area of said cylinder bore.

4. An internal combustion engine as claimed in claim 1, wherein said groove extends along said straight line.

5. An internal combustion engine as claimed in claim 4, wherein said groove has a width which is slightly smaller than the diameter of the valve head of said exhaust valve.

6. An internal combustion engine as claimed in claim 1, wherein the circumferential wall of said recessed portion is arranged to be substantially vertically extended.

7. An internal combustion engine as claimed in claim 6, wherein said recessed portion has a lung-shaped cross-section extending in a circumferential direction of said combustion chamber from said exhaust valve and having a concave contour portion, the spark gap of said spark plug being arranged in the vicinity of said concave contour portion.

* * * * *